US012728474B2

(12) United States Patent
Klein

(10) Patent No.: US 12,728,474 B2
(45) Date of Patent: Sep. 8, 2026

(54) ARC WELDING TORCH

(71) Applicants: SKS WELDING SYSTEMS GMBH, Kaiserslautern (DE); SKS WELDING SYSTEMS INC., Rochester Hills, MI (US)

(72) Inventor: Thomas Klein, Rodenbach (DE)

(73) Assignees: SKS WELDING SYSTEMS GMBH, Kaiserslautem (DE); SKS WELDING SYSTEMS INC., Rochester Hills, MI (US)

(*) Notice: Subject to any disclaimer, the term of this patent is extended or adjusted under 35 U.S.C. 154(b) by 552 days.

(21) Appl. No.: 17/766,234

(22) PCT Filed: Dec. 2, 2020

(86) PCT No.: PCT/IB2020/001072
§ 371 (c)(1),
(2) Date: Apr. 2, 2022

(87) PCT Pub. No.: WO2021/064471
PCT Pub. Date: Apr. 8, 2021

(65) Prior Publication Data

US 2024/0051056 A1 Feb. 15, 2024

(30) Foreign Application Priority Data

Oct. 3, 2019 (EP) .................................... 19000445

(51) Int. Cl.
*B23K 9/12* (2006.01)
*B23K 9/26* (2006.01)

(52) U.S. Cl.
CPC ................ *B23K 9/122* (2013.01); *B23K 9/26* (2013.01)

(58) Field of Classification Search
CPC .......... B23K 9/122; B23K 9/26; B23K 9/287; B23K 9/32; B23K 9/295
(Continued)

(56) References Cited

U.S. PATENT DOCUMENTS 7,309,844 B2 * 12/2007 Lajoie ...................... B23K 9/32 219/137.52
8,373,094 B2 * 2/2013 Wells ....................... B23K 9/32 219/145.1
(Continued)

FOREIGN PATENT DOCUMENTS

CN 103547401 A 1/2014
CN 108213654 A 6/2018
(Continued)

OTHER PUBLICATIONS

International Search Report and Written Opinion for corresponding PCT Application No. PCT/IB2020/001072 dated Apr. 27, 2021.
(Continued)

*Primary Examiner* — Steven W Crabb
*Assistant Examiner* — Alba T Rosario-Aponte
(74) *Attorney, Agent, or Firm* — Tarolli, Sundheim, Covell & Tummino LLP

(57) ABSTRACT

In the case of an arc welding torch device with a consumable electrode. The electrode in the arc welding torch device being guided in an exchangeable wire core, a guide element surrounding the wire core and designed as an exchangeable wear part. To reduce the risk of kinking of a welding wire of an arc welding torch device melting in the welding process, a kink protection means protruding from the arc welding torch device is passed through an outer end cap of the arc welding torch and arranged between the outer end cap of the arc welding torch and wire feeding means for the welding wire in which the welding wire is guided is proposed.

12 Claims, 11 Drawing Sheets

Figure 1:
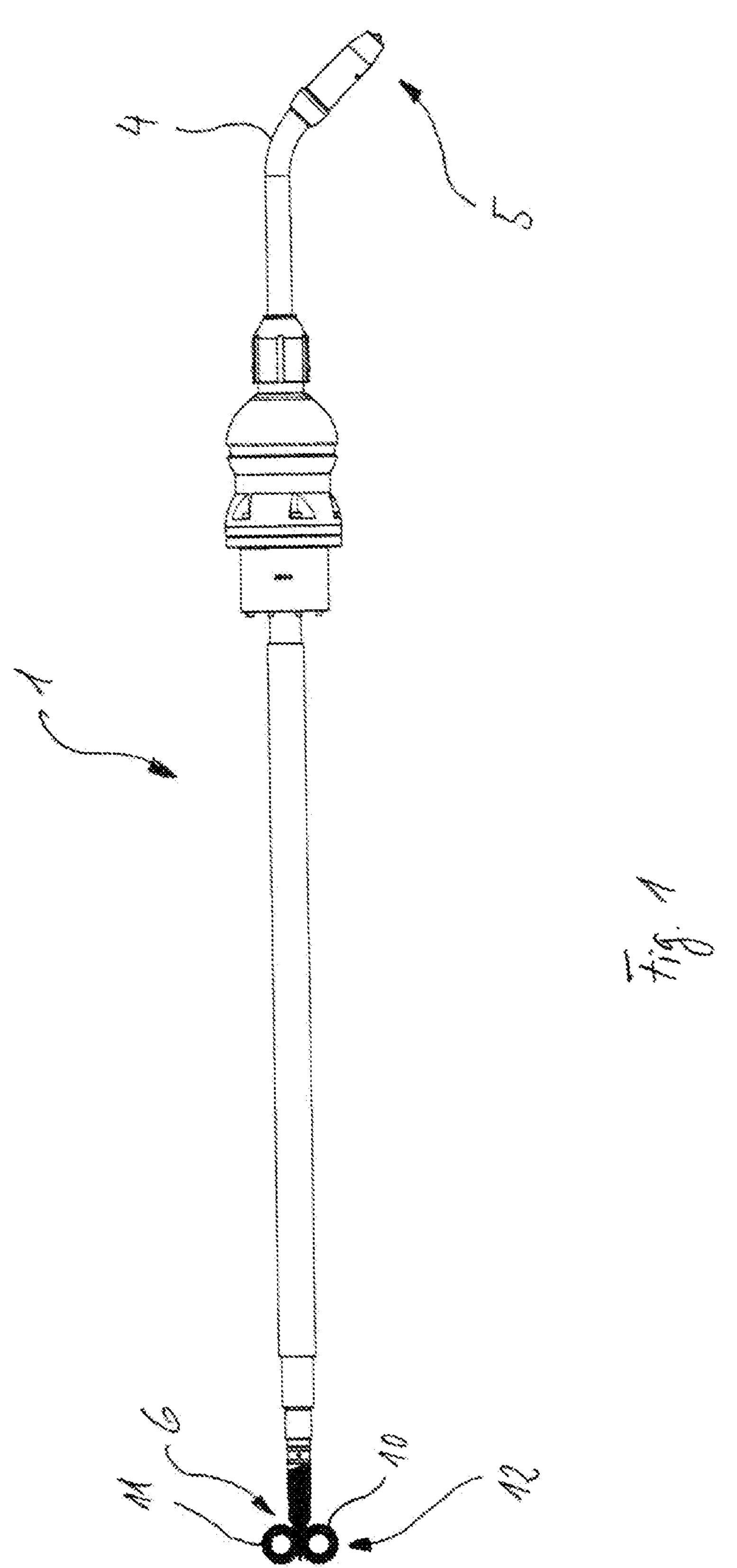

(58) Field of Classification Search
USPC .............. 219/137.9, 137.52, 137.51, 137.44, 219/137.42, 137.2, 137.31
See application file for complete search history.

(56) References Cited

U.S. PATENT DOCUMENTS

| | | | | |
|---|---|---|---|---|
| 2007/0000894 | A1* | 1/2007 | Klein | B25J 19/0029 219/137.9 |
| 2013/0048699 | A1 | 2/2013 | Fuerlinger et al. | |
| 2017/0165778 | A1 | 6/2017 | Hsu et al. | |
| 2017/0165780 | A1 | 6/2017 | Centner | |
| 2017/0282278 | A1* | 10/2017 | Centner | B23K 9/26 |
| 2018/0099346 | A1* | 4/2018 | Zwayer | B23K 9/26 |

FOREIGN PATENT DOCUMENTS

| | | | |
|---|---|---|---|
| CN | 110405321 | A | 11/2019 |
| CN | 111132789 | A | 5/2020 |
| DE | 1747118 | U | 6/1957 |
| DE | 1540862 | B1 | 12/1971 |
| DE | 102007061678 | A1 | 7/2009 |
| EP | 3799993 | A1 | 4/2021 |
| JP | H0970662 | A | 3/1997 |
| WO | 2005049259 | A1 | 6/2005 |
| WO | 2021064471 | A2 | 4/2021 |

OTHER PUBLICATIONS

Office Action for MX application No. MX/a/2022/003899, dated Oct. 1, 2025, 5 pages.

Office Action for CN application No. 201880066061.4, dated Oct. 9, 2025, 8 pages.

Mexican Examination report for MX application No. MX/2025/38353, dated Jun. 3, 2025, 10 pages.

* cited by examiner 13
2
9
8a
1
20
21
33
26
23
29
14
15
10
11
3
4

8a
32c
32
32b
34
32a
37
25a
17
25
20
18
18a
36
38
28
29
35
25b
33
13a
19
14b
30
14a
14
7
16

8a
25
32
4

7
8a
118c
118a
118b
118
114
142
107
109
123
141
145
126
135
148
149
151
153
154
155
110

108
115
117
113
114
116
142
143
143
123
127
141
150
136
125
145
133
145
124
126
135
137
148
149
152
151
153
154
155

108
144
142
123
145
135
133
136

103
102
105
108
A

106

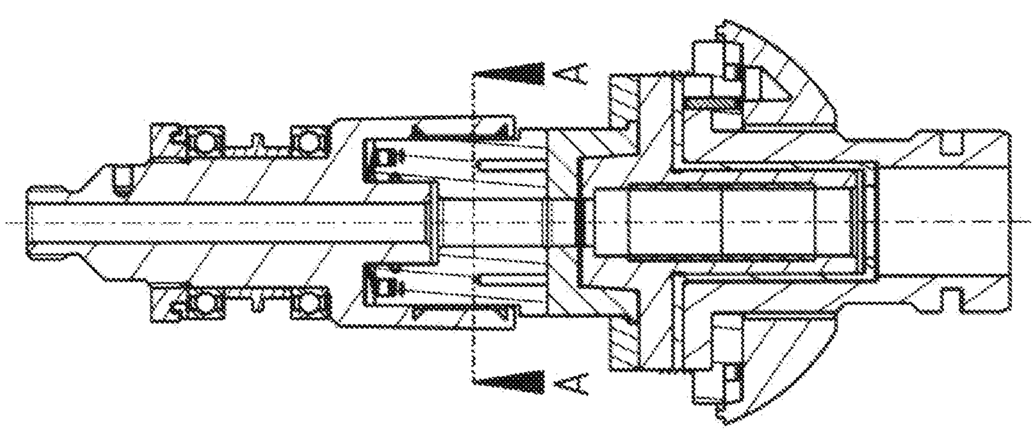
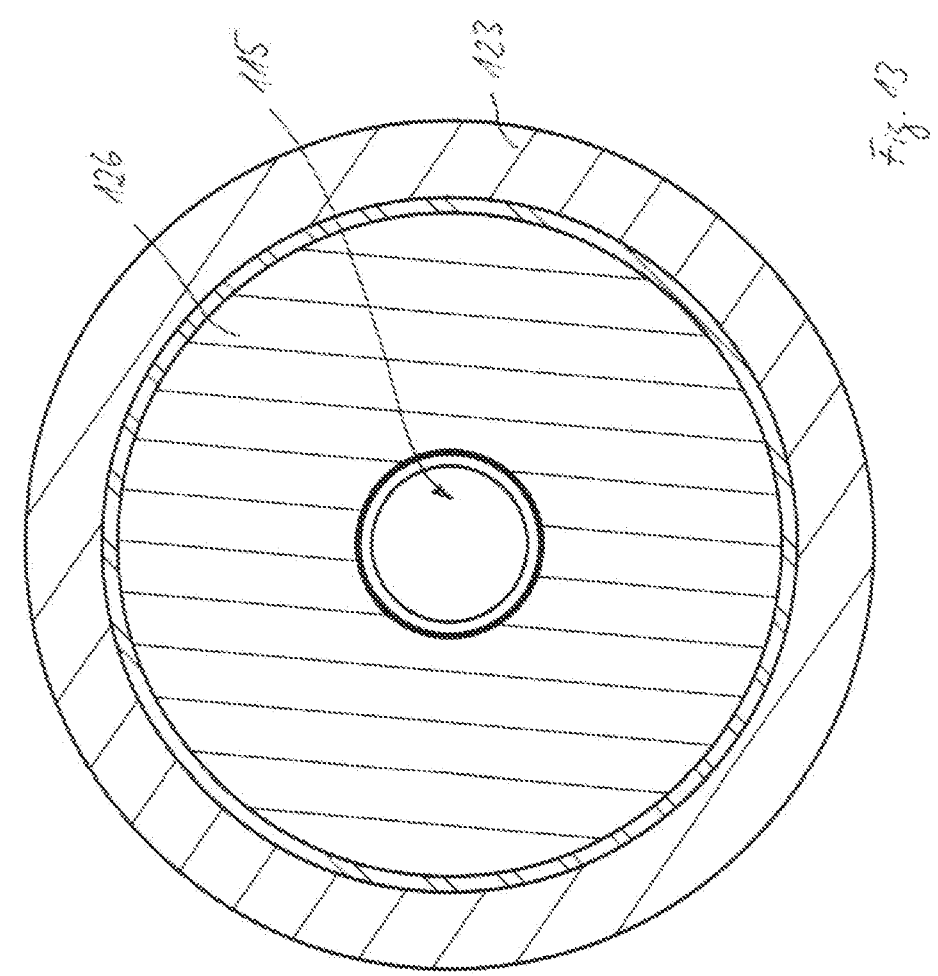
Fig. 13

ARC WELDING TORCH

RELATED APPLICATIONS

The present invention is a U.S. National Stage under 35 USC 371 patent application, claiming priority to Serial No. PCT/IB2020/001072, filed on Dec. 2, 2020; which claims priority from European Patent Application No. 19000445.7 filed on Oct. 3, 2019; the entireties of both are hereby incorporated herein by reference.

The invention relates to an arc welding torch device with a consumable electrode, the electrode being provided with a direction of movement from a rear end of the arc welding torch device for feeding in the direction of a front end of the arc welding torch device, in the region of which the electrode melts during an arc welding process, the electrode in the arc welding torch device is guided in an exchangeable wire core, the wire core in turn being arranged at least in the region of the rear end of the arc welding torch device in a guide element surrounding the wire core and designed as an exchangeable wear part, the guide element of the wire core being provided for joint replacement of the wire core due to wear.

There are a multiplicity of different welding processes. The present invention has particular relevance to arc welding. This is based on the heat generated by an electric arc between a welding electrode and a workpiece on which welding is to be carried out. Due to the heat development, the material or materials to be welded can be melted locally. In almost all arc welding processes, a protective gas is supplied to the area of the arc, on the one hand to enable a resistance-reducing ionized atmosphere between the welding electrode and the workpiece and, on the other hand, to prevent oxidation of the welding electrode and the workpiece. Instead of an inert gas provided here as a protective gas, an active gas or a mixed form can also be supplied, which is used for the reaction. Likewise, electrodes can be provided that do not require an external gas supply, since the substances required for this are integrated in the electrodes and are released when the electrodes melt.

An arc welding torch is usually designed so that a user or a robot can point a metal welding wire, which can also be referred to as a metal filler material, at a specified joint on the target metal piece. The welding wire is passed through the welding torch and finally transported to the target metal piece through an opening in the contact nozzle at the process-side end of the welding torch.

When an electrical voltage is applied to the welding torch inner tube and when the welding wire comes into contact with the target metal piece, a high electrical current flows from a welding torch inner tube via a so-called nozzle holder, then over the contact nozzle, over the welding wire and possibly an arc to the target metal piece and then to the ground. The high current and the arc cause the welding wire to melt in a protective gas atmosphere, which leads to the formation of droplets of the wire and the creation of an arc.

This arc melts the metal of the target metal pieces and the following welding wire. Due to the drops of the welding wire falling off or the drop being transferred in a short circuit to the liquefied point of the target metal pieces, these are connected to one another. Due to the small distance from the contact nozzle and the gas nozzle to the arc or the heated target metal piece, these components are strongly heated. Due to the high thermal load, the contact nozzle in particular is exposed to heavy wear.

Conventional torch systems consist in their front end section on the welding process side, as a rule, essentially of the contact nozzle, the nozzle assembly and the outer gas nozzle. These components are usually detachably mounted on the torch neck (outer tube, inner tube) and thermally or electrically coupled to one another or to other components of the torch neck or also insulated via contact surfaces, threads. However, the outer tube must be electrically decoupled from other live components, since no voltage may be applied there for safety reasons. The thermal coupling of the components tries to dissipate the energy that is introduced into the contact nozzle or gas nozzle in the form of heat via the outer tube or inner tube as effectively as possible and thereby lower the maximum temperature of the contact nozzle in order to minimize wear.

In the case of arc welding torch devices of the generic type, the welding wire functioning as a consumable electrode and the protective gas are usually supplied to the arc welding torch devices in the area of their rear end, provided the respective welding process provides such a gas. The welding wire is advanced through the interior of the arc welding torch device from its rear end to the exit from the front, process-side end according to the consumption. For this purpose, a previously known wire feed is arranged in the region of the rear end, which feeds the welding wire for example by means of a driven pair of wheels and moves it through the interior of the arc welding torch device. In order to protect the arc welding torch device itself from wear due to the feed movement of the welding wire, the welding wire is usually arranged in a so-called wire core. The wear due to the feed movement of the welding wire therefore takes place primarily in the wire core and not on components of the housing of the arc welding torch device. The latter thus wears out instead of the arc welding torch device itself. As a result, it is necessary that the wire core is replaced from time to time.

Conventionally, for the wear-related replacement of the wire core, it is necessary for the welding torch to be dismantled, in particular also and above all the other rear end of the arc welding torch facing away from the end on the welding process side, which is located opposite the wire feed means. This is associated with a large expenditure of time for the dismantling and assembly of the arc welding torch device. A solution has therefore already become known from EP 1 658 155 B1 in which the exchange of the wire core takes place from the end of the arc welding torch on the welding process side. To dismantle and remove the wire core, only the front end of the arc welding torch has to be dismantled, a connection of a guide means for the wire core with other components of the arc welding torch has to be released and the guide means removed together with the wire core. Then a new wire core together with the guide means is reinserted into the welding torch from the front, pushed through to the rear end of the welding torch and the guide means is releasably fastened again inside the arc welding torch.

Regardless of whether the wire core is changed from the front or the rear end of the arc welding torch device, the problem arises with both solutions that when the arc welding torch device is in operation, the welding wire is directly in the region between the wire feed means, which are usually designed as a rotating pair of rollers, and the rear end of the arc welding torch assembly opposite the wire feed means, may tend to kink. The welding wire pushed through the wire feed means runs through a narrow bore in an end cap of the arc welding torch device into the latter. If there is resistance, for example due to friction in the bore, this can cause the wire to deflect and kink outside the end cap. To counteract this, the end face of the end cap is usually designed conically so that the end cap can be pushed a little way into the funnel-shaped region between the two drive rollers. The slightly shortened region between the point of contact of the drive rollers with the welding wire and the entry point of the welding wire into the end cap, in which the welding wire is not yet in the arc welding torch or in the wire core protecting it, reduces the problem of kinking somewhat, but only slightly. The danger of kinking is still present, especially with very thin, soft wires, which is relevant in practice.

The invention is therefore based on the object of proposing measures by which the risk of kinking of a welding wire of an arc welding torch device melting in the welding process, in particular of an automatically fed welding wire, can be further reduced.

In an arc welding torch device of the type mentioned at the outset, this object is achieved according to the invention by an anti-kink means for the welding wire in which the welding wire is guided, protruding from the arc welding torch device and arranged between an outer end cap of the housing of the arc welding torch device and the wire feed means. The kink protection means should be passed through the end cap arranged on the rear end of the wire feed.

The invention is thus based on the idea of associating the arc welding torch device with a further component or element through which the welding wire is passed in the region of the rear end of the arc welding torch device, in addition to the component closing off its housing at the end, in particular the end cap. This further component should preferably extend from the end cap in the direction of the wire feed means. In addition, this kink protection means, which is designed as an additional component or element, should have the smallest possible external radial extent in relation to the longitudinal axis of the welding wire, in particular a significantly smaller radial extent in a plane that is perpendicular to the axes of rotation of the preferably two rollers of the wire feed means. The kink protection means can hereby be arranged as close as possible to the contact and active point of the wire feed means, which is usually designed as two counter-rotating rollers, with the welding wire, whereby the distance along which the welding wire is pushed and thereby runs freely and unguided can be kept as short as possible. As a result, the tendency of the welding wire to kink in its unguided section as a result of the feed movement can be significantly reduced.

In a preferred embodiment of the invention it can be provided that the kink protection means is detachably arranged in the arc welding torch device and passed through the end cap and a portion of the kink protection means protrudes from a recess in the end cap of the arc welding torch in the direction of the wire feed means. This makes it possible to achieve a particularly simple arrangement, positioning and, if necessary, also a simple exchange of the kink protection means, the guide element and the wire core, provided that they are designed overall as a common assembly. The recess of the end cap and/or the interior of the arc welding torch can be provided to achieve a positionally accurate and positionally secure arrangement of the kink protection, in particular by means of a form fit between the kink protection means and in particular the housing of the arc welding torch device. Furthermore, the kink protection means in the arc welding torch device can be arranged in one piece, removable and detachable from the process-side end, and a portion of the kink protection means protrude from a recess in the end cap of the arc welding torch device in the direction of the wire feed means.

In a further preferred embodiment of the invention, to avoid kinking—especially with very thin, soft wires—the outside of the end cap on the arc welding torch device can also run conically so that the end cap can be arranged as close as possible to the rollers of the wire feed means. As a further measure to reduce the danger of kinking of the welding wire, the recess in the kink protection means for feeding the welding wire through and for introducing the welding wire into the arc welding torch device can be provided with a bevel on the front side of its boundary wall. This facilitates quick and easy introduction of the welding wire into the kink protection means both in automated and manual threading and also reduces the risk of the welding wire kinking when the wire is being fed during operation of the arc welding torch device. Furthermore, the cylindrical recess of the kink protection for conveying the welding wire, together with the corresponding wire core, can be matched to the respective wire diameter, which also has a favorable effect on preventing the wire from kinking. The matching should preferably be at least such that the diameter of the through recess is only slightly larger than the diameter of the welding wire. Likewise, the material of the kink protection means can be matched to the material of the welding wire in such a way that, through a suitable choice of material, neither damage to the welding wire nor excessive wear of the kink protection means occurs.

It can furthermore be preferred that for an arc welding torch device according to the invention several, structurally different, kink protection means can be used alternately and alternatively to one another in the arc welding torch device. This makes it possible to react to different welding wire diameters and/or different welding wire materials without great effort. Since this type of welding wire and the wire core usually have to be exchanged anyway, this exchange can also be used to exchange the kink protection means. As a result, the kink protection means can be adapted without additional assembly or disassembly effort. With such an adaptation it can be taken into account, for example, that the diameter of the through recess for the welding wire in the kink protection means—apart from a possible run-in bevel—should only be slightly larger than the diameter of the welding wire. It can also be taken into account, for example, that a material hardness of the material used for the kink protection means should be greater than the hardness of the material of the welding wire so that the kink protection means has sufficient resistance to excessive wear. The hardness of the kink protection material should also not be so great that the latter is damaged by the axially moving welding wire. Possible and particularly suitable material pairings with regard to welding wire and the kink protection means are known to those skilled in the art.

The exchange of the wire core and its receptacle formed on the guide element for arranging one end of the wire core can be combined particularly favorably with an adaptation of the kink protection means to a specific welding wire in that the guide element and the kink protection means are designed as a common component. This common component, together with the wire core, preferably forms an assembly which can be exchanged as a whole and at the same time or together in one. This also opens up the possibility of introducing a common component of the guide element and the anti-kink means that is structurally more favorable and more suitable for the respective welding wire together with the new wire core into the housing each time a wire core is replaced.

As already mentioned, it is further preferred in connection with the present invention that the kink protection means is an integral part of a component in which the wire core is arranged in the region of the end cap inside the arc welding torch device. In this way, a very precise matching of the guidance of the welding wire in the kink protection means and in the interior of the arc welding torch device can be achieved in a particularly simple manner. Above all, this solution offers the possibility of a transition-free and stepless design of the at least one guide surface for the welding wire, which extends from the kink protection means to the beginning or rear end of the wire core inside the arc welding torch. The avoidance of transitions in this at least one guide surface also contributes to the improved kink protection to keep the resistance as low as possible when the welding wire is fed and thus to prevent the welding wire from kinking due to the advancing movement. Finally, the one-piece design also leads to a small number of required components that have to be assembled and stocked as spare parts.

The kink protection means is preferably designed as a wear part and can preferably be changed together with a wear-related wire core exchange, preferably as a jointly exchangeable assembly. It is particularly preferred here if the kink protection means is designed as a one-piece component together with the guide element having the receptacle for the wire core end. The kink protection function can further be optimized in that the through recess in the kink protection means for the welding wire is matched to the wire diameter. The material of the kink protection means can also be matched to the material of the welding wire. The preferred conical widening/bevel of the through bore of the kink protection means on the face of the end on the wire feed side also helps to avoid kinking. However, this widening/bevel also considerably improves the clean and, as far as possible, resistance-free entry of the welding wire during automated threading.

In a particularly advantageous embodiment of the invention, with which the kink protection means can be installed particularly quickly and also exchanged, for example if worn or damaged, it can be provided that the kink protection means is arranged without connection on the arc welding torch device. A connectionless arrangement allows, for example, the advantage that assembly and replacement can also be possible without tools. In order to achieve a positionally accurate and secure arrangement of the kink protection means on the arc welding torch device despite the preferred connectionless arrangement of the kink protection means on the arc welding torch, it can be provided that the kink protection means due to a positive arrangement of the kink protection means in the axial direction in the arc welding torch device, is arranged in a predetermined position in the arc welding torch device.

In a further particularly advantageous embodiment of the invention it can be provided that the kink protection means is designed in one piece with a receptacle for a wire core arranged within the arc welding torch device. This preferred design of the kink protection means can be achieved, for example, in that a conical section is attached to a first cylindrical section of the kink protection means with a smaller, preferably constant, outer diameter, which then transitions with a larger diameter than in the first and second section, into a third, but also at least substantially constant, diameter. A recess open at the end can be arranged within this third section, the inner diameter of which is large enough to accommodate an end region of the wire core and the welding wire guided therein. The welding wire preferably passes through an opening in the end face in the kink protection means into this one-piece component, which also enables a recess with a constant diameter which essentially corresponds to the diameter of the respective welding wire. This through recess can preferably open into the receptacle for the wire core. The welding wire is thus guided in the through recess of the kink protection means and from there passes directly into the wire core.

In a further preferred embodiment of the invention, the inside diameter of the through recess for the welding wire provided in the kink protection means can be matched to the diameter of the welding wire in which the welding wire is guided. The kink protection means can be wholly or partially part of the same component as the recess of the guide element for the wire core. An adaptation of the material of the kink protection means can also be provided depending on the material of the welding wire. The same or different materials can be provided, which lead to the least possible damage to the welding wire and the least possible wear of the kink protection means.

In connection with the present invention, advantages of the present invention can be particularly pronounced when a hollow-shaft robot, such as one of the "Motoman" type, which is offered as a welding robot by the manufacturer Yaskawa Europe GmbH, 65760 Eschborn, Germany, is used. In such hollow-shaft robots, the welding media, such as welding wire, protective gas and electric current, are carried out essentially or at least approximately concentrically to the axis of rotation of the hollow shaft through the receptacle designed as a rotationally driven hollow shaft for attaching the arc welding torch to the robot. Dismantling the arc welding torch itself and the robot mount is particularly labor-intensive here. Such a hollow-shaft robot and a particularly advantageous solution for an arc welding torch that interacts with this hollow-shaft robot is described, for example, in EP 1 689 550 B1. Their disclosure content is hereby fully incorporated by reference.

A preferred arc welding torch of an arc welding torch device, which is intended for arrangement on a welding robot provided with a robot arm, can therefore have a connection device which can be rotated relative to the robot arm and which has a fastening device for attaching the welding torch device to the welding robot, a receiving device for holding a welding torch and for transmitting driven rotary movements to the welding torch, an electrical connection for a welding current cable, by means of which a robot side of the welding torch device can be electrically connected to a welding power source, and a power transmission device via which the welding current cable can be electrically connected to a welding torch side of the welding torch device. The current transmission device can have a stator which is provided for a non-rotatable arrangement with respect to the robot arm, but which is rotatable relative to the connection device on the welding robot side. Furthermore, a through passage of the stator through which at least one of the consumables required for the welding process can be carried out in the direction of the receiving device is provided, the receiving device and the fastening device being designed as a rotor, which are thereby rotatable relative to the stator, and the receiving device and/or the fastening device can be connected to the stator in an electrically conductive manner by means of an electrical contact device, the fastening device of the rotor being designed for attachment to the connection device of the robot, and due to the attachment to the connection device of the robot, an axis of rotation of the rotor with the axis of rotation of the connection device of the Robot is at least substantially in alignment with the axis of rotation and the rotor is rotatable about the axis of rotation and about the stator.

It can furthermore be preferred if, in an arc welding torch device according to the invention, a recess is provided that runs along the axis of rotation of the rotor and runs centrally (in alignment) with respect to the axis of rotation through both the fastening device and through the receiving device, an inlet opening of the recess in the stator as well as an exit opening of the recess in the rotor also being arranged centrally and thus in alignment with respect to the axis of rotation. In this particularly preferred solution for hollow shaft robots, the entry opening in the arc welding torch for welding media coming from the welding cable is thus located along the axis of rotation of the arc welding torch. The outlet opening for the exit of welding media from the rotor and their passage into the welding torch neck is also located in alignment with the axis of rotation of the rotor. The entire recess thus preferably runs along the axis of rotation of the rotor and thus also of the robot-side connection device with which rotational movements of the rotor around the stator are generated and transferred from the robot to the rotor.

In such a preferred embodiment of the invention, the welding wire can thus be inserted into the arc welding torch device at the end on the wire feed side and passed through the wire core to the end of the arc welding torch on the process side. While the arc welding torch device is in use, the welding wire is pushed in because of the welding wire tip melting off in the process region. The welding wire is thereby moved lengthways through the entire arc welding torch device and, in the case of a hollow shaft robot, thus also through the connecting flange of the hollow shaft robot for the arc welding torch and through its stator. To replace the wire core and its assembly, the arc welding torch must preferably only be slightly dismantled in the area of its process-side end, so that there is access to the process-side end of the wire core, which can then be completely pulled out of the arc welding torch and its process-side end by hand. The arc welding torch device remains unchanged on the connection flange of the hollow shaft robot and the worn and the new wire core and the associated assemblies, preferably including a position signaling means and/or preferably the kink protection means, are moved inside the arc welding torch and thus through the connection flange. The exchange of the wire core can thus be carried out extremely quickly and reliably with little effort, even with a hollow shaft robot.

In connection with a preferred one-piece construction of a component which comprises the guide element for receiving one end of the wire core and a section in which the welding wire enters the arc welding torch device on the wire feed side, particular advantages can result when using an arc welding torch device on a hollow-shaft robot. Both the wire core and the component of the arc welding torch device in which the welding wire coming from the wire feed device first enters the arc welding torch device are usually wearing parts due to the relative movement of the welding wire in these components and must therefore be replaced from time to time. Since in the solution according to the invention the wire core and the guide element receiving one end of the wire core are to be exchanged together due to wear, it is of great advantage if the guide element and the kink protection means provided with the entry opening for the welding wire and a through recess for the latter are integrally formed and thus pulled out together for replacement at the process-side end from the arc welding torch device. In the case of a multi-part design of the components in question, this prevents the arc welding torch device from also having to be dismantled at the end on the wire feed side in order to replace the component due to wear, which receives the welding wire when it enters the arc welding torch device. This component can preferably be a kink protection means which is advantageously formed in one piece with the receptacle for the end of the wire core.

A kink protection means according to the invention can therefore have particular advantages in connection with an automated welding process and a hollow-shaft robot used in it, because this welding equipment leads to a particularly narrow welding torch and automatic welding torch machine that has few interfering contours and therefore has good accessibility to workpieces where there is only little room for movement for the automatic welding machine. In the case of a hollow-shaft robot, neither the welding torch nor a hose package for the welding torch are offset in parallel and are arranged at a distance from the axis of rotation of the receiving flange of the robot for the arc welding torch. In the case of hollow-shaft robots, the arc welding torch is aligned with its axis of rotation with respect to its stator and rotor concentrically to the axis of rotation of the connecting flange of the robot, with which a relative movement between the stator and rotor of the arc welding torch can be generated by the robot. These conditions with regard to the accessibility of the components often prevail when welding aluminum workpieces. In order to be able to weld aluminum workpieces in an arc welding process, aluminum welding wires are usually also used, but these are comparatively soft and can easily kink. With the invention in question, therefore, especially with workpieces made of comparatively soft materials, such as aluminum workpieces in particular, in connection with a hollow shaft robot, the possible uses and the functional reliability of automated arc welding systems with the possibility of endless rotation of the welding torch can be further improved.

Further preferred embodiments of the invention emerge from the claims, the description and the drawing.

Figure 2:
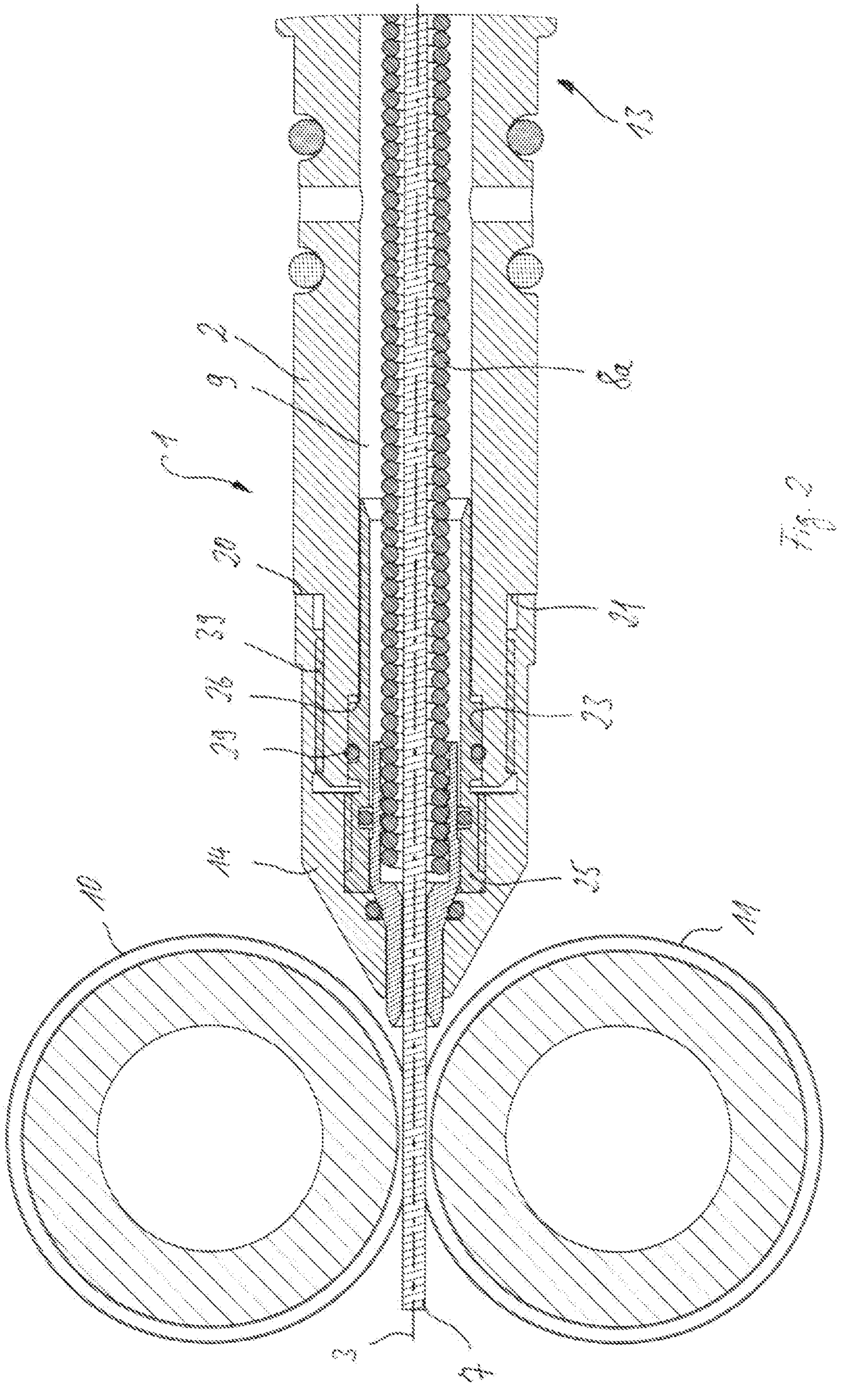
Figure 3:
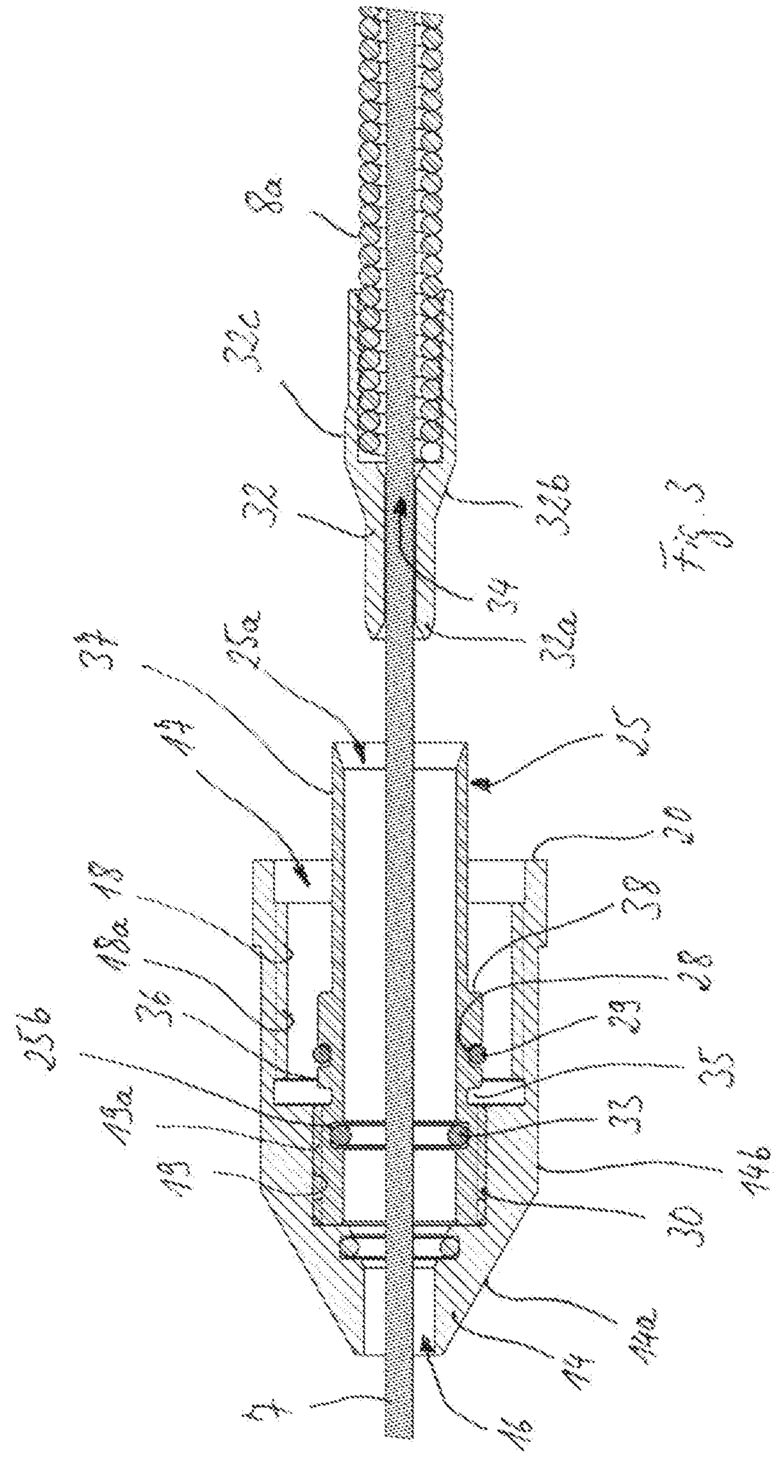
Figure 4:
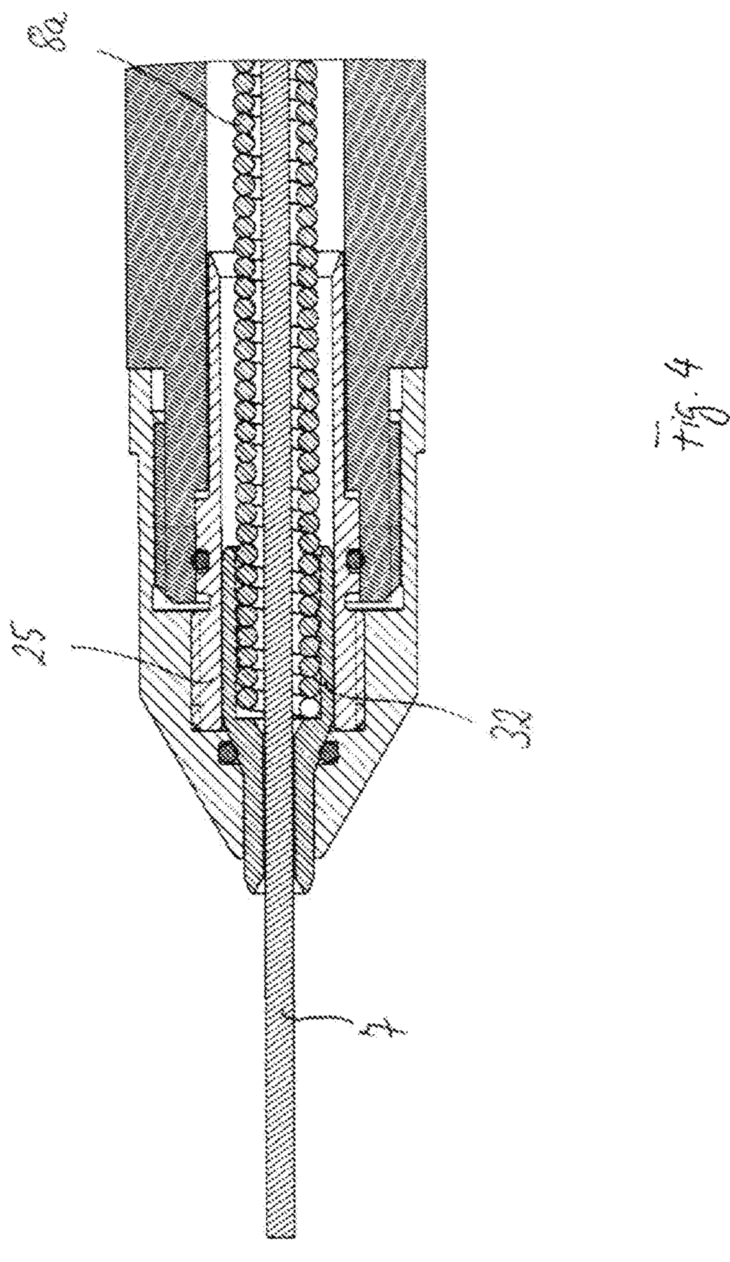
Figure 5:
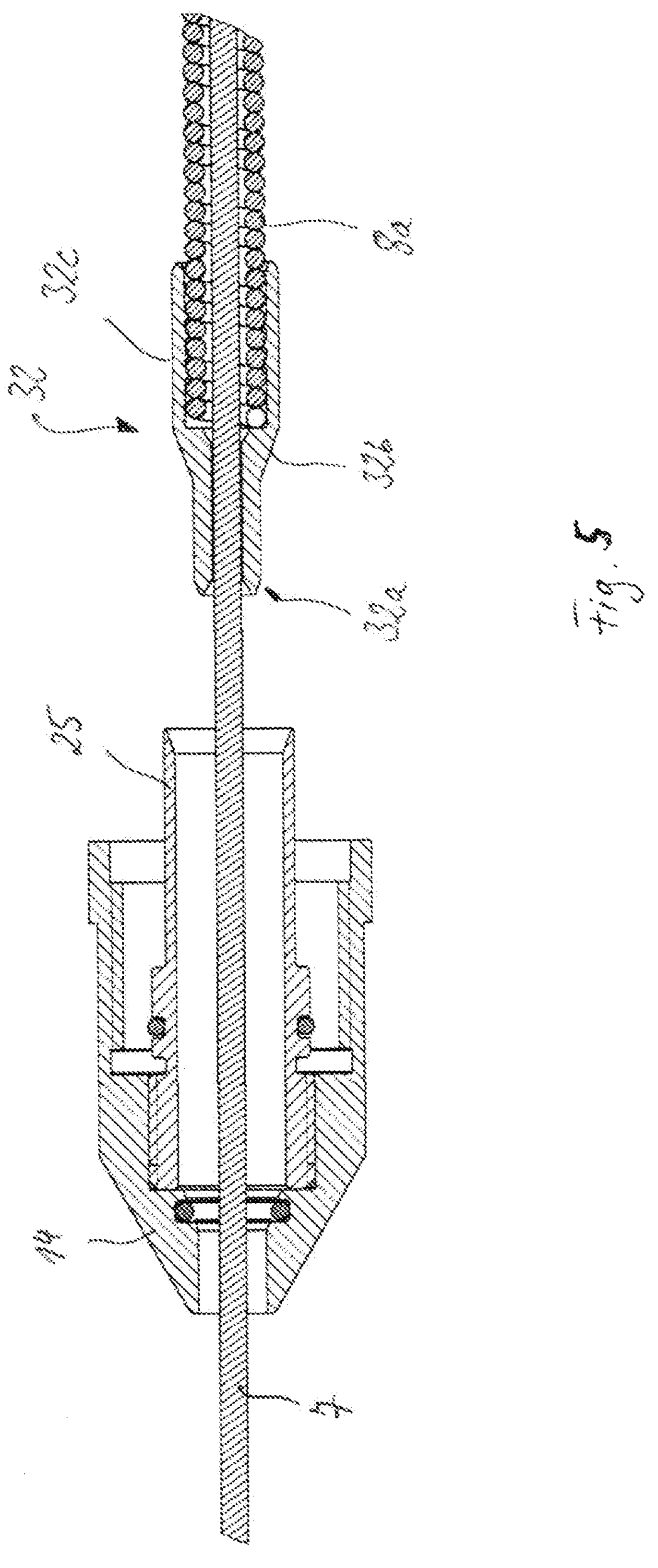
Figure 6:
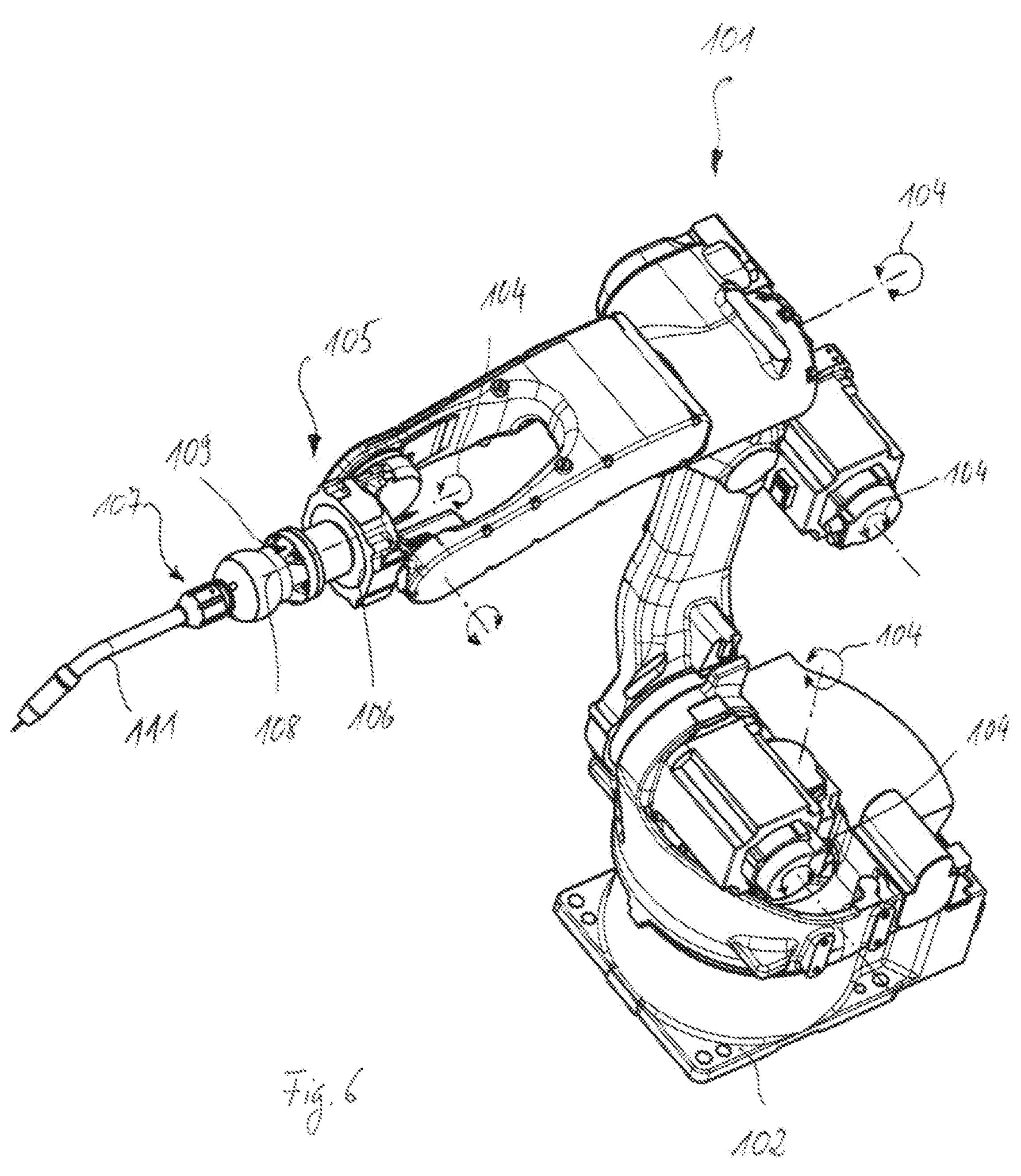
Figure 7:
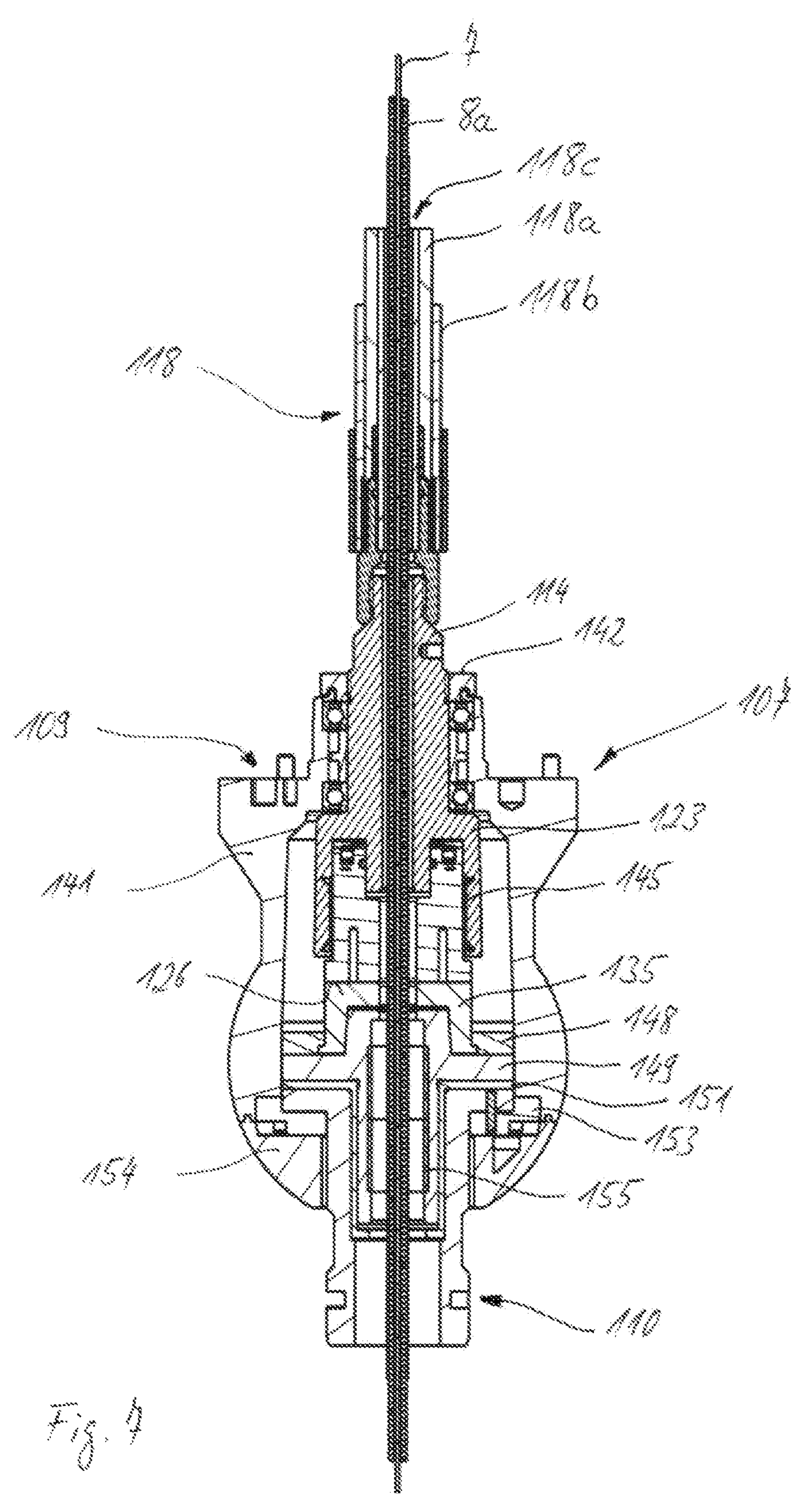
Figure 8:
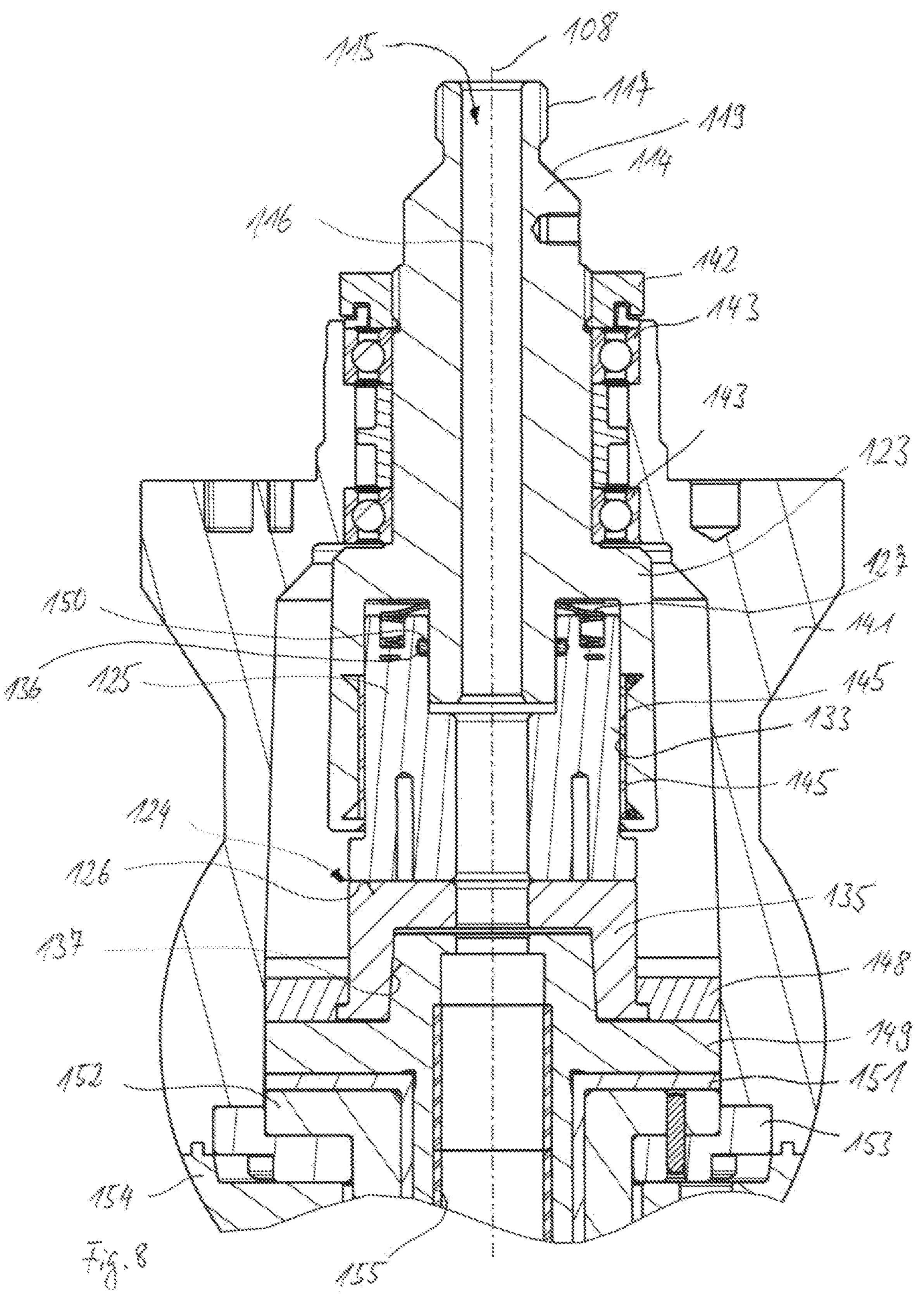
Figure 10:
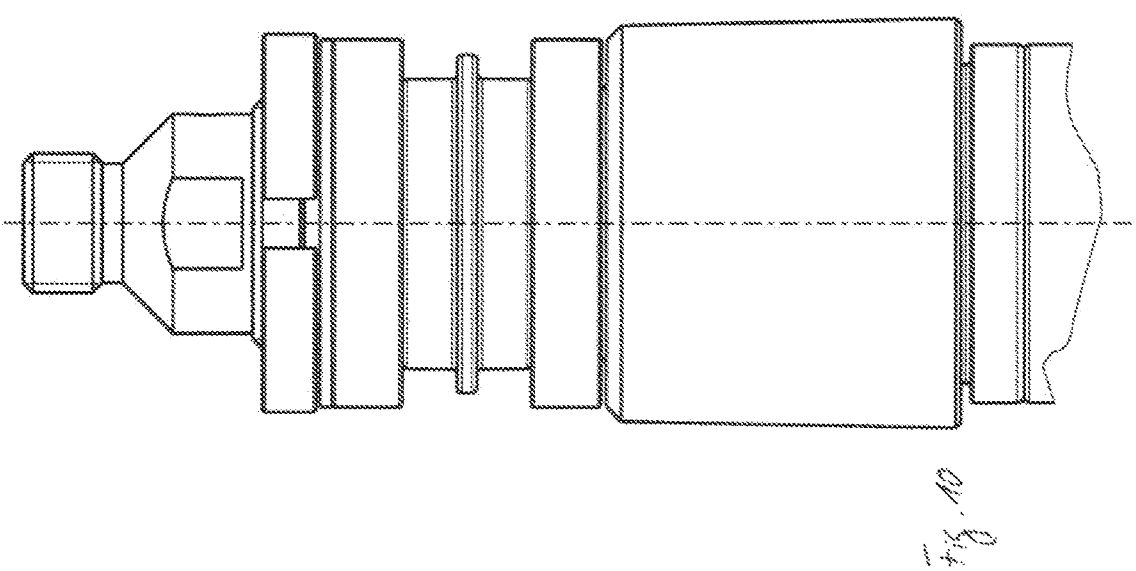
Figure 9:
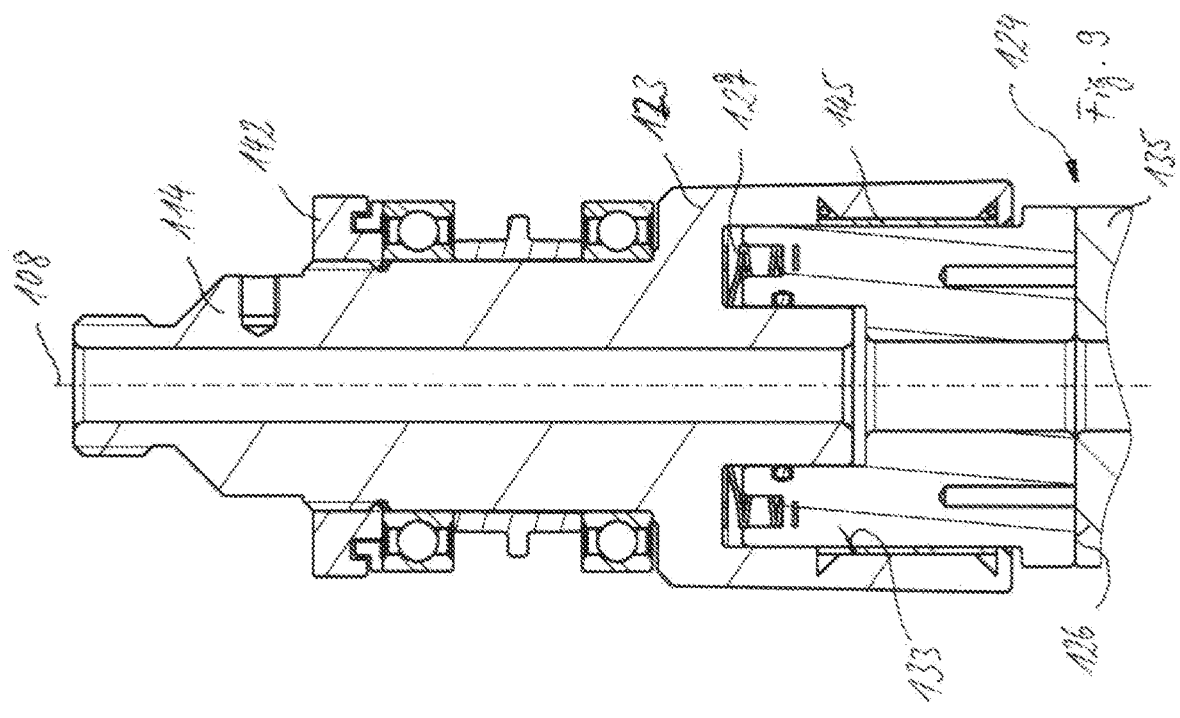
Figures 11, 12:
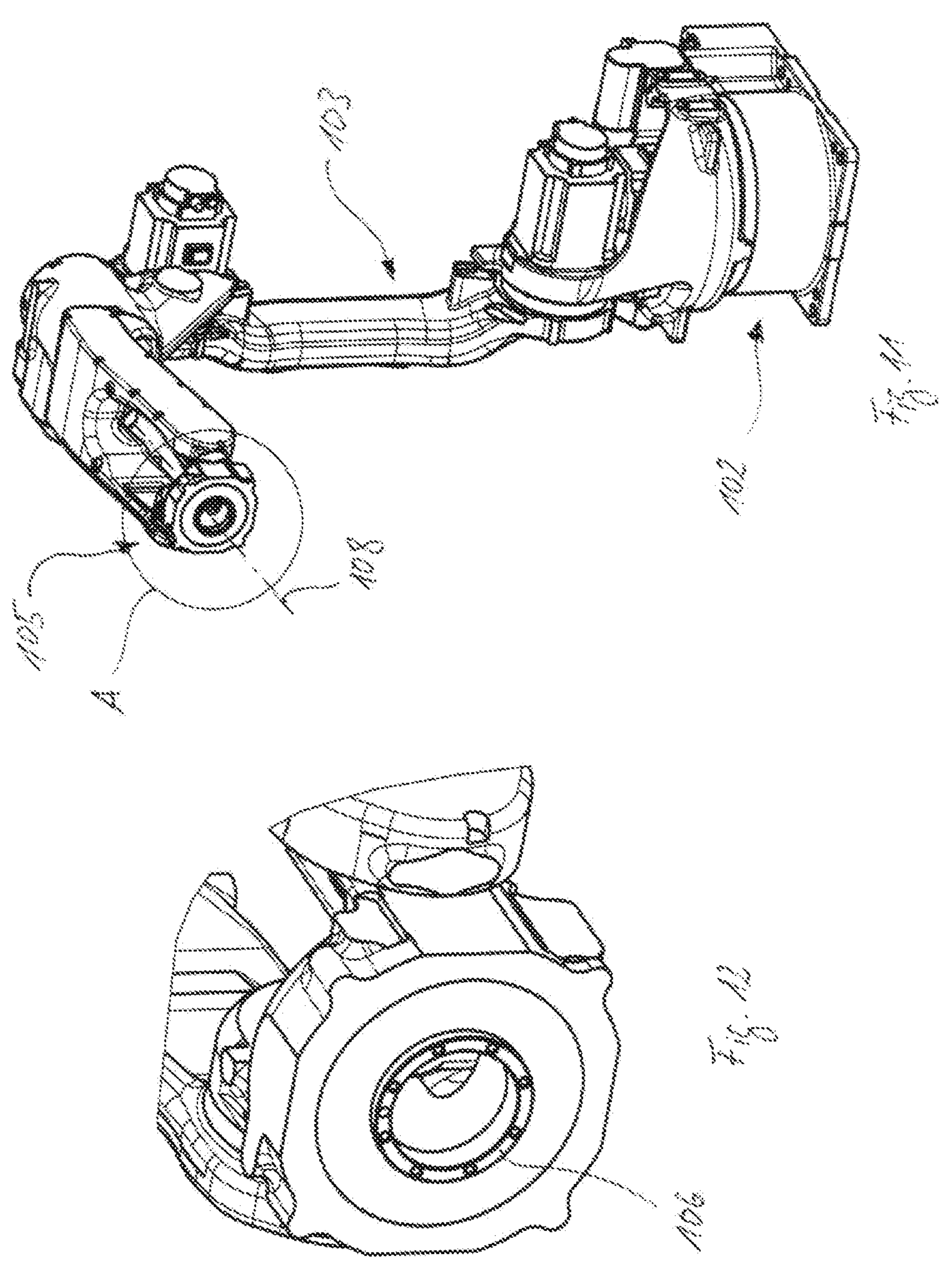

The invention is explained in more detail with reference to embodiments shown purely schematically in the figures, which show:

FIG. 1 a preferred embodiment of an arc welding torch device according to the invention together with a wire feed device;

FIG. 2 a sectional illustration of a rear end region of the arc welding torch device from FIG. 1;

FIG. 3 an exploded view of the detail from FIG. 2;

FIG. 4 a sectional view of a rear end area of a further embodiment of an arc welding torch device according to the invention;

FIG. 5 an exploded view of the detail from FIG. 4;

FIG. 6 a highly schematic representation of an articulated arm robot seen as a welding robot;

FIG. 7 a highly schematized basic sectional illustration of an embodiment of a welding torch of an arc welding torch device;

FIG. 8 a more detailed illustration of the welding torch device of FIG. 7;

FIG. 9 a stator of the welding torch device from FIG. 8 together with a sliding contact device in a sectional view;

FIG. 10 a side view of the assembly of FIG. 9;

FIG. 11 an embodiment of a suitable articulated arm robot;

FIG. 12 an enlarged detailed illustration according to line A from FIG. 11.

FIG. 13 a cross-sectional view of the slide contact device from FIG. 10;

FIG. 1 shows a preferred embodiment of an arc welding torch device 1 according to the invention. The arc welding torch device 1 is intended for use in an automatic welding machine, such as a welding robot not shown in detail. The arc welding torch device 1 is arranged on an end manipulator of the robot, not shown in detail, which can be moved in different spatial directions, preferably in all spatial directions on any desired feed paths. The end manipulator can thereby carry the arc welding torch 1 along its feed path and the arc welding torch 1 can perform weld seams on workpieces. The arc welding torch can in principle be designed in the same way as the arc welding torch disclosed and described in WO 2005/049259 A1, whereby differences to the end area of the arc welding torch from FIG. 1 are present which are discussed below. Due to the not absolutely necessary, but particularly preferred embodiment of the arc welding torch 1, according to which it has an external stator part and an internal rotor part and the welding point is fed and supplied with welding media at least essentially along and coaxially to a longitudinal axis 3 of rotation of the arc welding torch device and the end manipulator, the welding torch can be continuously rotated and twisting of a welding cable during rotational movements can be avoided. It is explicitly pointed out that the arc welding torch shown and discussed here is only given as an example of the invention and the invention can in principle also be used in connection with other types of arc welding torches and in particular with arc welding torch devices, the specific structure of which differs from the structure of the arc welding torch device discussed below.

The arc welding torch device 1 shown merely as an example for the invention is a welding torch 1 operating according to the metal/shielding gas welding process. In this case, a welding wire 7 which melts off during the welding process is fed to the intended welding point and continuously followed along during a welding process due to the consumption of the welding wire 7. The welding wire 7 is here as a rule fed through the interior of the welding torch 1, mostly through a jacket tube 2, together with its wire core 8*a* and preferably an insulation surrounding the welding wire. In addition, a protective gas is supplied to the welding point, usually also through the jacket tube 2. In the embodiment, the protective gas is an inert gas; in other embodiments according to the invention, an active gas—or a mixed form of both—can also be supplied as protective gas. In the preferred embodiment, current is also introduced into the arc welding torch device 1 in the region of the rear free end 6 of the arc welding torch device and passed through the arc welding torch device to the welding or process point, which is used at the welding point or in the area of the welding process-side end 5 of the arc welding torch device, to ignite an arc and maintain it for the welding process. The arc welding torch device 1 is therefore connected or provided in its use with a welding power source (not shown) and a wire feed means 12. In preferred embodiments, both the welding wire and the protective gas and the current can be fed to the arc welding torch at its power connection point via a welding cable known per se, in particular a coaxial welding cable. At a gas connection point of the arc welding torch device 1, the protective gas is introduced into a duct 9 of the welding torch 1 in its interior for the passing through the protective gas from the connection point to the free end of the welding point. The current is also conducted from the welding cable through the welding torch 1 to the welding or process point. The current is also conducted inside the welding torch to the process point in such a way that an outside of the arc welding torch device 1 is current-free.

The arc welding torch device 1 thus has a torch neck 4 which is connected to a hose package 2. The hose package 2 runs approximately from the rear end 6 of the arc welding torch device 1 to the welding torch at the front end 5 on the welding process side. In the region of the rear end 6, which is shown in FIG. 2, several replaceable wear parts are arranged in the interior of the arc welding torch 1, which will be discussed in more detail below.

In a sectional view in FIG. 2, the rear end 6 of the arc welding torch device 1 facing away from the welding process point and the associated front open end 5 of the arc welding torch device 1 is shown together with two drive rollers 10, 11 of a wire feed device 12. In this illustration, the welding wire 7 is shown between the two drive rollers 10, 11 opposite one another with their peripheral surfaces. The drive rollers 10, 11 are located directly opposite the rear end 6 of the arc welding torch device 1 facing away from the process point of the arc welding torch 1. This front end 6 of the approximately tubular jacket tube terminates with an end cap 14 which has a through bore 16 (FIG. 3) along the central axis 3 of the housing 13 which is open towards the front outer end of the end cap 14. The end cap 14 is open towards the process-side end of the arc welding torch device and from there is provided with a stepped central recess 17 in the direction of the open through bore 16. The latter initially has a constant larger diameter 18, which merges into a constant diameter 19 of the recess which is smaller in comparison therewith. The latter area in turn merges into the through bore 16. The inner peripheral surface of the smaller diameter portion 19 is provided with an internal thread 19*a*. Likewise, the inner circumferential surface of the region of the larger diameter 18 also has an internal thread 18*a*. The latter extends until shortly before the transition to the smaller diameter 19.

The outer or jacket surface of the end cap 14 has a section 14*a* which widens conically from the end in the direction of the process point and which merges into a section 14*b* of the jacket surface with a constant diameter. With its end face 20 facing the process point, the end cap 14 abuts an outer shoulder 21 of the jacket tube 2 of the arc welding torch 1. The jacket tube 2 protrudes into the area of the larger inner diameter 18 of the end cap 14 until shortly before the transition to the smaller diameter 19. An inner diameter 23 of a through recess of the jacket tube 2 in the region of its front end corresponds to the smaller diameter 19 of the recess 17 of the end cap 14, so that a sleeve-shaped inlet body 25 with its outer jacket surface can be received in the jacket tube 2 at least essentially with a positive fit. To secure the position of the sleeve-shaped inlet body 25 in the axial direction, the through recess 24 of the jacket tube 2 has a shoulder 26 with a smaller inner diameter, the shoulder being provided as a stop for the inlet body 25.

In the region of the jacket tube 2, a recess 28 or a radially circumferential groove is formed on the outer surface or on the outer jacket surface of the sleeve-shaped inlet body 25, which is intended to receive a sealing element 29 or sealant, such as an O-ring in particular. A section of the outer surface of the inlet body 25, which is located opposite the smaller diameter 19 of the recess of the end cap 14, is provided with an external thread 30, which is screwable into the internal thread 19*a* of the cylindrical circumferential surface of the section with the smaller diameter 19 of the recess 17 of the end cap 14.

The sleeve-shaped inlet body 25 is formed with a through recess 25*a* which is provided with a consistently constant inside diameter. Only in the region in which a guide element 32, preferably without connection to the inlet body, is located in the through recess 25*a* of the inlet body 25, the recess 25*a* has an insertion 25*b* or groove for the arrangement of a sealing element 33 or sealing means, such as an O-ring in particular. The sealing element arranged in the groove 25*b* of the inlet body 25 thus has contact with the outer jacket surface of the guide body 32.

The inlet body 25 has an outer jacket surface with different sections which differ from one another primarily in the size of the outer diameter. In the embodiment shown, a first section of the outer jacket surface close to the rear end of the arc welding torch has the external thread 30, with which the inlet body 25 is screwed into the internal thread 19*a* of the end cap 14 and thereby releasably connected to the end cap 14. Towards the process-side end 5 of the arc welding torch device 1, the external thread 30 is followed by an insertion 35, which in turn is followed by a threadless section 36 of the outer jacket surface, which has the same external diameter as the threaded section 30. The threadless section 36 has the circumferential groove 28 in which the further sealing element 29 can be received, in the case of the embodiment shown, an O-ring.

In the direction of the process-side end 5, a further, last, section 37 of the outer jacket surface of the inlet body 25 then follows, which also has a constant but smaller outer diameter than the preceding section. The shoulder 38 formed by means of the change in diameter between the last section 37 of the outer jacket surface and the section 36 preceding it results in an insertion or rotation limitation for the jacket tube 2 on the inlet body.

The jacket tube 2 in turn has in the region of its front end on its outer jacket surface an external thread 39, onto which the end cap 14 is screwed with its internal thread 18*a*. The screwing-in movement is limited by the end face 20 of the end cap 14 pushing against the shoulder 21 of the jacket tube. Reaching this position can be a visual check that the end cap is correctly mounted and screwed.

In FIG. 3, the wire feed side or rear end 6 of the arc welding torch device 1 is shown in an exploded view and situation, as it also results when changing the wire core 8*a*. As can be seen here, the inlet body 25 is screwed into the end cap 14 during operation of the arc welding torch device 1. Likewise, all seals are inserted in their grooves and remain there even when the wire core is changed. In the representation of FIG. 3, the jacket tube 2 is not shown, which is connected unchanged to the end cap 14 by its common screw connection and remains connected even during the change of the wire core 8*a*. In order to change the wire core 8*a*, the arc welding torch at the process-side end 5 is first dismantled so that the wire core 8*a* and the guide element 32 can be pulled out of the process-side end 5 together. In a current arc welding torch from the applicant, in which the invention described here is to be integrated in the future, for example the gas nozzle, a current contact nozzle and possibly a nozzle assembly can be detached from the arc welding torch and removed from the welding wire. The wire core 8*a* can then be pulled out of the arc welding torch from the process-side end 5. Here, the guide body 32 seated on the wire core 8*a* and connected to the latter by a press fit, together with the wire core, is pulled out of the arc welding torch device 1. The guide element, which is seated in the recess of the end cap and the recess of the inlet body in this embodiment largely without connection to the two components, can thus be pulled out of the two components and from the arc welding torch 1 together with the wire core 8*a* without additional effort, in particular without great effort. When this assembly is pulled out, only a comparatively low holding force acting on the jacket surface of the guide element through an O-ring seal has to be overcome.

A new wire core 8*a* can then be arranged with one of its two ends on the welding wire 7 and inserted into the guide body 32 and arranged. The guide body 32 can then be pushed together with the wire core 8*a* together and in a single operation on the welding wire 7 into the welding torch and thus also into the arc welding torch device 1. This insertion movement in the direction of the end cap 14 is continued until the guide body 32 with its end 32*a* on the end cap and serving as a position indicator is completely guided through the open through recess 16 of the end cap 14 and the end 32*a* of the guide element 32 protrudes outwards out of the end cap 14. The end of the guide element 32, which is arranged outside of the arc welding torch device 1 with one of its ends 32*a* and is optically recognizable, provides a means of checking, without additional technical effort, whether the guide body 32 and the wire core 8*a* are arranged in their predetermined target positions within the arc welding torch device 1. Since the guide body 32 is only sealed against leakage of the protective gas flowing in the arc welding torch device in its target positions, the end 32*a* of the component of the guide body 32 that is visible outside the end cap 14 also provides a check to determine whether the newly introduced wire core 8*a* and its guide body 32 are arranged in such a way that the arc welding torch 1 is sealed against escape of protective gas from the end 6 of the arc welding torch 1 on the end cap.

The component of the guide body 32 has the cylindrical end region section 32*a* facing the wire feed device in its use position on the arc welding torch 1, which in the embodiment is elongated and has a constant outer diameter. The end region section 32*a* merges into a section 32*b* which enlarges conically towards the end 5 on the process side and which in turn is adjoined by a cylindrical section 32*c* with a larger, preferably constant, outer diameter. In the embodiment in FIGS. 2 and 3, the section 32*c* has a shoulder with a slightly reduced outer diameter. When it is inserted into the arc welding torch device 1, the guide body 32 is inserted into the inlet body 25 with its end region 32*a* first. Since a front outside diameter of section 32*c* in the insertion direction corresponds approximately to the inside diameter of through recess 25*a* of inlet body 25, the guide body is guided within the inlet body during its feeding movement. As a result, the end region section 32*a* is also aligned in the correct position and hereby arranged concentrically around the longitudinal axis 3 and can be inserted into the through recess 16 of the end cap 14. Since the end region portion 32*a* has a constant outer diameter which is only slightly smaller than the diameter of the through recess 16, the end region portion 32*a* can be completely inserted into the through recess and part of the end region portion 32*a* can be led out of the through recess 16 of the end cap. This part of the end region section, which can be referred to as position indicator means, is thus recognizable from the outside in its end position in the welding torch 1 and is located comparatively close to the point of application of the wire feed device at which the feed movement is applied to the welding wire 7. This position display means can be used for signaling, which is visually perceptible from the outside, that the guide body and the wire core 8*a* are correctly positioned in the interior of the arc welding torch.

The one-piece component of the guide body 32 is provided with a through recess 34 which, in the region of the end region section 32*a*, has a preferably constant diameter which is only slightly larger than the diameter of the welding wire used in this case. In the region of the section 32*c* with the larger outer diameter, the through recess 34 has a larger, but also constant diameter, whereby the rear end of the wire core 8*a* can be arranged in this area of the through bore. The inside diameter of the recess 34 in this region corresponds approximately to the outside diameter of the wire core. With its front end, the wire core 8*a* abuts the shoulder 34*a* resulting from the change in diameter in the through recess 34. The one-piece nature of the guide body 32 results in good guiding properties for the welding wire in the guide body 32, with at most a low risk that the welding wire 7 will get caught during its movement and thereby kink.

Chamfering the opening of the through recess 34 in the region of the end face of the end region 32*a* of the guide body can contribute to preventing the welding wire 7 from getting caught on or in the guide body 25 during the feed movement and to facilitating the introduction of a welding wire end into the guide body 25.

Provision can also be made for different guide elements 32 with different diameters of the through recess 34 being provided for different welding wires. Such a system can in particular have identical guide bodies in their geometrical outer shape, but which differ in terms of the diameter of the respective through recess 34 and possibly also in terms of the materials used for the guide elements, whereby an adaptation to the respective material of the welding wire can take place in an advantageous manner.

The end 32*a* of the component of the guide element 32, in which the welding wire 7 is guided, protruding from the end cap 14, also shortens the free and unguided length of the welding wire between the wire feed device and the arc welding torch device 1. Due to the smaller outer diameter of the end of the component of the guide element 32 compared to the front end of the end cap, the component of the guide element protruding from the arc welding torch device can be arranged closer to the contact point of the welding wire with the two feed rollers of the wire feed device. The welding wire is thus received earlier by the component of the guide element and guided by it, which reduces the risk of the welding wire kinking. The section of the component of the guide element with the smaller outer diameter, which is guided through the end cap 14 and protrudes from it, can be referred to as a kink protection means.

The invention also has the advantage that, unlike in the past, the end cap 14 neither guides nor touches the welding wire 7 nor the wire core 8*a*, and thus the end cap 14, which is usually complex, is no longer a wear part.

In the representations of FIGS. 4 and 5, a further preferred embodiment of the invention is shown. This is largely identical to the preferred embodiment from FIGS. 1 to 3, which is why only the differences will be discussed below in order to avoid repetitions. The above description of FIGS. 1 to 3 is therefore also incorporated by reference for the embodiment in FIGS. 4 and 5.

The main difference to the embodiment of an arc welding torch device according to FIG. 1-3 is that the guide element 32 has (only) one section 32*c* with a larger diameter which is continuous after its conical section 32*b* in the direction of the process-side end of the torch which has a constant diameter. In this preferred embodiment, there is no increase in diameter on the jacket surface of the guide element following the conical section—and viewed in the direction of the process-side end—which could be used for a form-fitting and/or force-fitting holding of the guide element. In addition, in this preferred embodiment, no sealing element, such as the sealing element 33 from the other embodiment of FIGS. 2 and 3, rests against the outer circumference of the section 32*c* with a constant diameter. Thus, there is also no sealing element between the inlet body 25 and the guide element 32 which could exert a holding force on the guide element 32 on the guide element 32. This has an advantage especially when changing the wire core 8*a*, since due to the lack of holding force on the guide element 32, the wire core and the guide element can be removed more easily, i.e. with less effort, from the arc welding torch device towards the process-side end. However, since the arc welding torch devices according to the invention have signaling means with which the correct position can be checked by means of the signaling means, preferably during the entire use of the arc welding torch with a certain wire core, additional holding forces are also not absolutely necessary.

In FIG. 6-13, among other things, an articulated arm robot 101 is shown, as it is already used in many ways. The articulated arm robot 101 is designed as a so-called hollow shaft robot, which is particularly suitable in connection with the invention. Such suitable robots can be, for example, the robots of the AR or MA series, which are offered by the company Yaskawa Europe GmbH, 65760 Eschborn. The robot has a frame part 102 and an arm 103 which is arranged thereon and which is provided with a plurality of joints 104. The free end 105 of the arm of the articulated arm robot 101 is thus able to travel along any three-dimensional movement paths.

At the free end 105 of the arm 103, the robot is provided with a connecting flange 106 of a connecting device which is provided for receiving a welding torch 107 (FIG. 6) of the arc welding torch device. The connecting flange 106 can execute a motor-driven rotational movement about an axis of rotation 108 and relative to the last link of the arm 103. In FIG. 6, a spacer block is drawn in front of the burner, which serves as an extension of the connecting flange 106 of the robot and can be provided as an option and not as a necessity.

The arc welding torch 107 shown in more detail in FIGS. 7 to 10 has a fastening device 109 and a receiving device 110 (FIG. 7). The fastening device 109 is provided to connect the welding torch 107 to the connecting flange 106 of the robot arm 103 in a detachable, but non-rotatable manner. In contrast, the receiving device 110, together with a contact device, serves to receive a welding torch neck 111 of the welding torch 107 and to transfer the welding current to the welding torch neck 111, which is explained in more detail below. Since the receiving device 110 can be connected non-rotatably to the connecting flange 106 of the robot, which executes rotational movements, via the fastening device 109, in a manner which will be explained in more detail below, the receiving device 110 and the fastening device 109 are also jointly referred to as part of a rotor which, by means of driven movements of the connecting flange, can perform such rotational movements about the axis of rotation 108. For this purpose, the rotor is non-rotatably connected to the connecting flange, in particular is detachably connected.

In relation to the last link of the robot arm 103 to which the connecting flange 106 is attached, the rotor can be rotated about the axis 108. The robot shown in the figures has a total of six driven axes, this number being only an example of the possible uses of the arc welding torch. In connection with the arc welding torch according to the invention, articulated arm robots with a different number of driven movement axes can also be used.

A stationary stator located on the inside opposite the rotor and the last link of the robot arm 103 has a tubular through passage 114 which is arranged centrally in the welding torch device and has a cylindrical recess 115. A longitudinal axis 116 of the recess 115 is aligned with the axis of rotation 108 of the connecting flange 106. The through passage 114 extends approximately over the entire length of the fastening device and the receiving device. The upper end of the through passage 114 on the robot side is provided with an external thread 117 serving as an electrical connection, onto which a coaxial cable 118 (FIGS. 6 and 7) can be detachably attached by being screwed on. In addition to the thread 117 of the through passage, a cone 119 (FIG. 8) can also be provided as a current-conducting contact between a welding current cable 118*a* of the coaxial cable 118 and the through passage 114. In the case of such a coaxial cable 118, the welding current cable 118*a* provided with an outer insulation 118*b* is arranged coaxially around a central channel 118*c*. The central channel 118*c* can serve to feed the welding wire 7 to the welding torch by means of a feed movement and to allow a protective gas to flow to the front end of the welding torch 107.

In the region of an end on the welding torch side, which is lower in the illustration, the through passage 114 is surrounded by a bell-shaped section 123 (FIGS. 8 and 9) of the stator which is circular in cross section and which is electrically conductively connected to the through passage. In the embodiment, the bell-shaped section 123 and the through passage 114 are connected in one piece. A contact device 124, which has a slip ring 125 arranged in the bell-shaped section, is arranged essentially inside the bell-shaped section 123 on the through passage 114. The contact device 124 has a slip surface 126 formed on the end face on the slip ring 125. On the one hand, the slip surface 126 is force-loaded by a compression spring 127 acting parallel to the longitudinal axis 116 of the through passage 114. The compression spring 127 is supported on the inside on the bell-shaped section 123 of the stator and presses the slip surface 126 against a likewise essentially annular surface of a connecting bell 135. Both the annular surface of the connecting bell 135 and the slip surface 126 are components of a contact device 124 and are each arranged concentrically around the longitudinal axes 108, 116 and penetrated by a continuation of the recess 115.

Between the slip ring 125 and an inside of the bell-shaped section 123 there are contact lamellae 145, which establish the electrical contact between the slip ring 125 and the bell-shaped section 123. The spring action of the contact lamellae 145 has the effect that an electrical contact is established between the slip ring 125 and an inner surface 133 of the bell-shaped section 123. The material of the slip ring 125 is a good electrical conductor, for example copper or a copper alloy. The contact lamellae 145 can preferably be silver-plated accordingly in order to ensure particularly good electrical current transfer. The side of the slip ring 125 facing away from the compression spring 127 with its slip surface 126 (FIG. 9) is designed as a stationary component and as part of the stator and acts as an electrical transition to the rotor which is rotatable about the longitudinal axis 108 and to which the connecting bell 135 belongs.

Thus, the connecting bell 135 (FIG. 8) adjoins the slip ring 125 in the direction of the longitudinal axis 116 of the through passage 114 and in the direction of the welding torch-side end, which is also electrically conductive due to a preferably silver-plated surface. The through passage 114, the slip ring 125 and the connecting bell 135 have aligned central bores, which overall are part of a central recess 115 running along the longitudinal axis 108.

The compression spring 127 thus presses on the slip ring 125, which in turn presses on the connecting bell 135 via its slip surface 126, and the latter is therefore constantly in contact with the slip surface 126, in particular in electrically conductive contact. The connecting bell 135 is additionally secured in relation to its axial position on the through passage by means of a ring 148. Furthermore, the connecting bell 135 is paired with the conical outer surface of the "brass flange with bushing" 149 via a conical, silver-plated inner surface and is axially centered. In addition, a seal 136 is located between the bell-shaped element 123 of the stator and the slip ring 125 in a groove 150 of the slip ring 125, with which it can be ensured that the bell-shaped element 123 sits gas-tight on the slip ring 125 as part of the stator.

A "brass flange with bushing" 149, which is paired with the preferably silver-plated connecting bell 135 via a cone, is screwed via a plastic insulating sleeve 151 to a fastening element 152, which is part of the fastening device and serves as a counterpart for the welding torch connection.

The housing 141, an end cover 142 adjoining one end of the housing 141 and a cover 154 adjoining the other end of the housing 141 in the direction of the welding torch neck 111 are designed as plastic components in the embodiment. In the embodiment, the housing 141 also contains the fastening device 109 for fastening to the connecting flange 106 on a hollow shaft robot and, together with the cover 154 and the closing cover 142, electrically encloses and isolates the internal structure. The receiving device 110 of the welding torch is made of metallic, electrically conductive material, but it is also separated from current-carrying components via the plastic sleeve 151 with a flange as an insulator. The receiving device 110 for the welding torch is accordingly passed through the plastic housing 141 and the cover 154.

The fastening device 109 embodied as part of the plastic housing 141 is non-rotatably but detachably connected to the connection flange of the robot 106. The receiving device 110 for the welding torch, to the fastening element 152 of which a welding torch is releasably connected in a rotationally fixed manner, is also connected non-rotatably to the plastic housing 141. In principle, the housing 141 located on the outside of the welding torch is a component of the rotor of the arc welding torch. This rotor is arranged concentrically to the internal stator of the arc welding torch and with respect to the axis of rotation 108 and can rotate about the latter due to motor-driven rotational movements of the connecting flange 106 of the robot relative to the internal stator. In contrast, the stator is stationary when the rotor moves together with the robot-side connecting flange 106 and does not rotate with it. In the embodiment, this fixed arrangement with respect to the connecting flange 106, the fastening device 109 and the rotor can be achieved overall, for example, in that the welding cable is fastened to the thread 117 of the through passage 114 and is fixed in its rotative position due to the torsional rigidity of the welding cable. In other embodiments of the invention, an additional rotation lock of the stator on the robot can also be provided.

This makes it possible to transmit a rotary drive movement of the connecting flange 106 of the robot to the welding torch via the plastic housing 141, with the aid of a fastening ring 153 arranged in the housing 141 and the fastening element 152. The stator, however, does not perform this rotary movement, since it is rotationally fixed to the robot arm via the coaxial cable 118—and possibly via further fastening means. The resistance to torsion exhibited by such cables 118 can, however, already be sufficient to fix the stator, although a small proportion of the torque of the drive movement can possibly be transmitted to the stator via the bearings 143 due to frictional torques that cannot be completely ruled out. In the illustrated embodiment, the stator has at least the components, the through passage 114 and the slip ring 125 together with the compression spring 127. The rotor is mounted on the stator by means of bearings 143, here in the embodiment ball bearings.

The plastic housing 141 is closed with the cover 154, which covers the fastening ring 153, towards the welding torch. The housing 141 is covered by the closing cover 142 towards the welding torch cable. As far as it appears necessary, the stator can also be additionally fixed to a rotationally fixed component of the robot, for example via the closing cover 142.

The electrical current required to carry out a welding process flows, beginning with the welding current cable 118*a*, which is connected to the through passage 114 of the stator via the screw connection on the external thread 117, and continues in the stator to the bell-shaped section 123. There are contact lamellae 145 via which the current is transmitted to the slip ring 125, which also belongs to the stator. The current is transmitted to the silver-plated connecting bell 135 via the slide contact between the slide surface 126 and the connecting bell 135. The connecting bell 135 is part of the rotor and rotates with a driven rotational movement of the connecting flange 106 together with the housing 141 about the axis of rotation 108, The connecting bell 135 has a conical, equally silver-coated surface 137 on one inner surface, which is paired with a counter-cone of the brass flange 149 with bushing and thus has a tightly pressed fit and thus has good power transmission properties. In the brass bushing 149 there is another electrically conductive contact lamella 155 ×6, with which the welding current is transmitted to the welding torch via an inserted inner tube. The torch is fastened via the fastening element 152, which is insulated from the inner tube.

The protective gas can flow via the coaxial cable 118 through the recess 115 of the through passage 114 to the welding torch neck 111. The welding wire 7 can also be fed to the welding torch neck 111 in the same way and pushed in each time. If necessary, a data cable (not shown) can be integrated into the coaxial cable 118.

| List of reference symbols | |
|---|---|
| 1 | Arc welding torch |
| 2 | Jacket pipe |
| 3 | Longitudinal axis |
| 4 | Torch neck |
| 5 | Welding-process-side end |
| 6 | Rear end |
| 7 | Welding wire |
| 8a | Wire core |
| 9 | Duct |
| 10 | Drive roller |
| 11 | Drive roller |
| 12 | Wire feed device |
| 13 | Housing |
| 14 | End cap |
| 14a | Conical section |
| 14 | Cylindrical section |
| 16 | Open through bore |
| 17 | Stepped central recess |
| 18 | Larger diameter |
| 18a | Inner thread |
| 19 | Smaller diameter |
| 19a | Inner thread |
| 20 | Face |
| 21 | Outer shoulder |
| 23 | Inner diameter of 2 |
| 24 | Through recess of 2 |
| 25 | Sleeve-shaped inlet body |
| 25a | Through recess |
| 25b | Insertion/groove |
| 26 | Shoulder |
| 28 | Insertion/groove |
| 29 | Sealing element |
| 30 | External thread (of 25) |
| 32 | Guide element |
| 32a | End/end region |
| 32b | Conical section |
| 32c | Section |
| 33 | Sealing element |
| 34 | Through recess |
| 34a | Shoulder |
| 35 | Insertion |
| 36 | Threadless section |
| 37 | Smaller diameter section |
| 38 | Shoulder |
| 39 | External thread (of 2) |
| 101 | Articulated robots |
| 102 | Frame |
| 103 | Arm |
| 104 | Joint |
| 105 | Free end |
| 106 | Connecting flange |
| 107 | Welding torch |
| 108 | Axis of rotation |
| 109 | Fastening device |
| 110 | Receiving device |
| 111 | Welding torch neck |
| 114 | Through passage |
| 114a | Longitudinal groove |
| 115 | Recess |
| 116 | Longitudinal axis |
| 117 | External thread |
| 118 | Coaxial cable |
| 118a | Welding current cable |
| 118b | External insulation |
| 118c | Channel |
| 119 | Cone |
| 123 | Bell-shaped section |
| 124 | Contact device |
| 125 | Slip ring |
| 126 | Slip surface |
| 127 | Compression spring |
| 129 | Recess |
| 130 | Compression spring |
| 133 | Inner surface |
| 134 | Slip surface |
| 135 | Connecting bell (silver-plated) |
| 136 | Seal |
| 137 | Flange surface |
| 141 | Plastic housing |
| 142 | Closing cover |
| 142a | Bore |
| 143 | Bearing |
| 145 | Contact lamella |
| 148 | Ring |
| 149 | Brass flange with bushing |
| 150 | Groove (of 126) |
| 151 | Plastic sleeve |
| 152 | Fastening element |
| 153 | Fastening ring |
| 154 | Cover |
| 155 | Contact lamella |

The invention claimed is:

1. An arc welding torch device comprising:

a consumable electrode provided with a direction of movement from a rear end of the arc welding torch device for advancement in the direction of a front end of the arc welding torch device, in a region of which the consumable electrode melts during an arc welding process;

an outer end cap arranged at the rear end of the arc welding torch device;

a guide element arranged in a region of the rear end of the arc welding torch device, the guide element having an end region, the end region having a kink protection means comprising an end portion, the kink protection means protruding through the outer end cap in a direction from the front end to the rear end of the arc welding torch device and being arranged between the outer end cap and a wire feed means; and an exchangeable wire core arranged in the guide element, wherein the guide element is provided for joint wear-related replacement of the exchangeable wire core, wherein the consumable electrode is guided in the exchangeable wire core from the rear end to the front end of the arc welding torch device, and wherein the consumable electrode is consumed at the front end during the arc welding process, wherein a maximum outside diameter of the kink protection means protruding from the outer end cap is smaller than a diameter of a through bore of the outer end cap.

2. The arc welding torch device according to claim 1, wherein the kink protection means is detachably arranged in the arc welding torch device and a section of the kink protection means protrudes from a recess in the outer end cap of the arc welding torch device.

3. The arc welding torch device according to claim 1, wherein the kink protection means is formed in one piece with a receptacle for the exchangeable wire core arranged within the arc welding torch device.

4. The arc welding torch device according to claim 1, wherein the kink protection means is arranged without connection on the arc welding torch device.

5. The arc welding torch device according to claim 1, wherein the kink protection means is arranged in a predetermined position in an axial direction of the arc welding torch device.

6. The arc welding torch device according to claim 1, wherein at least one section of the kink protection means is sleeve-shaped.

7. The arc welding torch device according to claim 1, wherein the kink protection means, the guide element, and the exchangeable wire core are designed as an assembly which can be exchanged jointly through the front end of the arc welding torch device.

8. The arc welding torch device according to claim 1, which is provided for arrangement on a welding robot which has a robot arm on which a connection device is provided which is rotatable relative to the robot arm, the welding robot comprising:

a fastening device for attaching the welding torch device to the welding robot, a receiving device for holding the welding torch device and for transmission of driven rotary movements to the welding torch device, an electrical connection for a welding current cable where the welding torch device can be electrically connected to a welding current source, a current transmission device via which the welding current cable can be electrically connected to a welding torch side of the welding torch device, the current transmission device having a stator, which is provided opposite the robot arm for non-rotatable arrangement, but which is relatively rotatable with respect to the connection device, a passage of the stator through which the consumable electrode required for a welding process can be passed in a direction of the receiving device, wherein the receiving device and the fastening device are designed as a rotor, which are thereby rotatable relative to the stator, and the receiving device and/or the fastening device can be connected to the stator in an electrically conductive manner by means of an electrical contact device, and wherein the fastening device of the rotor being designed for attachment to the connection device of the robot, and due to the attachment to the connection device of the robot, an axis of rotation of the rotor is aligned with the axis of rotation of the connection device of the robot and the rotor can be rotated about the axis of rotation and about the stator.

9. The arc welding torch device according to claim 8, wherein a recess in the stator running along the axis of rotation of the rotor which runs centrally with respect to the axis of rotation through both the fastening device and the receiving device, both an inlet opening of the recess in the stator and an outlet opening of the recess in the rotor also being arranged centrally with respect to the axis of rotation.

10. The arc welding torch device according to claim 1, further comprising:

a sleeve-shaped inlet body, and a sealing element arranged on a section of an outer surface of the guide element, wherein the sleeve-shaped inlet body is provided with a cylindrical recess, and wherein the section is located within the cylindrical recess of the sleeve-shaped inlet body.

11. The arc welding torch device according to claim 1, further comprising a sleeve-shaped inlet body, wherein the guide element is arranged in the sleeve-shaped inlet body in a force-fitting or form-fitting manner.

12. The arc welding torch device according to claim 1, further comprising a sleeve-shaped inlet body, wherein the sleeve-shaped inlet body is provided on an inner surface with a recess or a groove in which a sealing element is arranged, and wherein the sealing element is in contact with an outer surface of the guide element.

* * * * *